(12) United States Patent
Takamatsu

(10) Patent No.: US 12,431,595 B2
(45) Date of Patent: Sep. 30, 2025

(54) BATTERY

(71) Applicant: Prime Planet Energy & Solutions, Inc., Tokyo (JP)

(72) Inventor: Hiroshi Takamatsu, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 533 days.

(21) Appl. No.: 17/974,527

(22) Filed: Oct. 27, 2022

(65) Prior Publication Data

US 2023/0136476 A1    May 4, 2023

(30) Foreign Application Priority Data

Oct. 29, 2021   (JP) .................. 2021-177784

(51) Int. Cl.
*H01M 50/538* (2021.01)
*H01M 50/184* (2021.01)

(52) U.S. Cl.
CPC ....... *H01M 50/538* (2021.01); *H01M 50/184* (2021.01)

(58) Field of Classification Search
CPC .. H01M 50/538; H01M 50/536; H01M 50/54; H01M 50/534; H01M 50/531; H01M 50/184; H01M 50/186
See application file for complete search history.

(56) References Cited

U.S. PATENT DOCUMENTS

| | | | |
|---|---|---|---|
| 6,844,110 B2 * | 1/2005 | Enomoto | H01M 50/516 429/185 |
| 11,063,303 B2 * | 7/2021 | Guen | H01M 50/553 |
| 2021/0104796 A1 * | 4/2021 | Wakimoto | H01M 50/176 |

FOREIGN PATENT DOCUMENTS

| | | |
|---|---|---|
| JP | 2016105348 A | 6/2016 |
| JP | 201750069 A | 3/2017 |
| JP | 2017117648 A | 6/2017 |

* cited by examiner

*Primary Examiner* — Raymond Alejandro
(74) *Attorney, Agent, or Firm* — HAUPTMAN HAM, LLP

(57) ABSTRACT

A battery is provided in which damage of the electrode tab group is suitably inhibited. In a suitable embodiment of the herein disclosed battery, the positive electrode tab includes a boundary portion between a forming area in which a protective layer is disposed and a tab exposed area in which the positive electrode tab is exposed. At least a part of the separators among the separators configuring the electrode body having a laminate structure are joined to each other, and at least a part of the join part is closer to the boundary portion.

7 Claims, 10 Drawing Sheets

BATTERY

CROSS REFERENCE TO RELATED APPLICATIONS

The present application claims the priority based on Japanese Patent Application No. 2021-177784 filed on Oct. 29, 2021, the entire contents of which are incorporated in the present specification by reference.

BACKGROUND

The present disclosure relates to a battery.

Japanese Patent Application Publication No. 2017-050069 discloses a battery in which a positive electrode tab group is provided at one end part in a longitudinal direction of an electrode body, and in which a negative electrode tab group is provided at the other end part. Then, a technique of connecting to an electrode electrical collector part in a state of keeping the electrode tab group folded and bent is disclosed.

SUMMARY

An object of the present disclosure is to provide a battery that suitably inhibits damage of an electrode tab group.

In order to implement the object, the present disclosure provides a battery, including one or a plurality of electrode bodies, each having a laminate structure in which a first electrode and a second electrode being a counter electrode of said first electrode are configured to overlap via a separator, and including a battery case that is configured to accommodate said electrode body. Said battery case is provided with an outer package that includes a bottom wall, a pair of first side walls extending from said bottom wall and being mutually opposed, a pair of second side walls extending from said bottom wall and being mutually opposed, and an opening part being opposed to said bottom wall, and is provided with a sealing plate which is configured to seal said opening part and to which a terminal electrically connected to said first electrode is attached. Said electrode body includes a first electrode tab group including a plurality of tabs that protrude from an end part opposed to one second side wall of said pair of second side walls, and a second electrode tab group including a plurality of tabs that protrude from an end part opposed to another second side wall of said pair of second side walls, said first electrode tab group and said terminal are electrically connected via an electrical collector part, said first electrode tab group is joined to said electrical collector part in a state of being bent to arrange at least a part of said first electrode tab group along one second side wall among said pair of second side walls, and said tab includes a boundary portion between a forming area on which an active material layer or a protective layer is disposed and a tab exposed area on which said tab is exposed. Here, at least a part of said separators, among said separators configuring said electrode body having said laminate structure, are joined to each other, and at least a part of said join part is disposed closer to said boundary portion.

According to the examination of the inventor, it has been found that the electrode tab is easily damaged at a boundary portion of the electrode tab between a forming area on which an active material layer or a protective layer is disposed and a tab exposed area on which the electrode tab is exposed. In a case of a battery in which at least a part of the separators, among the separators configuring an electrode body, are joined to each other and at least a part of the join part is disposed closer to the boundary portion, the load applied onto the electrode tab is facilitated to be dispersed to the separators, and thus, it has been found that the damage on the electrode tab group can be suitably inhibited. In addition, it can be thought that the mechanical strength of the boundary portion as described above is reinforced by including the joined separators. Therefore, it is possible to suitably inhibit the damage on the electrode tab group.

In a suitable aspect of the herein disclosed battery, said separators on which said join part is formed are unevenly distributed at a side where a bend of said first electrode tab group is softer. The folded and bent portion of the electrode tab group (in other words, softer bend portion of the electrode tab group) is particularly damaged easily, and thus, by disposing the separator, on which the join part is formed, at the above described portion, it is possible to further suitably inhibit the damage on the electrode tab group.

In a suitable aspect of the herein disclosed battery, at least a part of said join part is adjacent to said boundary portion. By disposing the join part, which is formed on the separators, at a position adjacent to the boundary portion, it is possible to efficiently disperse the load applied on the boundary portion to the separators. By doing this, it is possible to further suitably inhibit the damage on the electrode tab group.

In a suitable aspect of the herein disclosed battery, a shortest distance from a base portion of said tab to an end part of said separator in a protruding direction of said tab is twice or more of a shortest distance from said base portion of said tab to said boundary portion. By the configuration of the battery as described above, it is facilitated to secure the area of the join part, and thus it is preferable.

In a suitable aspect of the herein disclosed battery, a ratio (B/A) of said join part with respect to a length A in a protruding direction of said tab and a length B in a direction orthogonal to said protruding direction of said tab is equal to or more than 1.3. According to the battery including the join part configured as described above, the join strength of the separators to each other is suitably enhanced, and thus it is preferable.

In a suitable aspect of the herein disclosed battery, a number of said separators, on which said join part is disposed, is equal to or more than 3, and is equal to or less than 40% when a total number of said separators configuring said electrode body having said laminate structure is treated as 100%. According to the battery configured as described above, it is possible to make the load, generated at the time when the electrode tab group is folded and bent, be appropriate, and thus it is preferable.

In a suitable aspect of the herein disclosed battery, at least a part of said join part is disposed even at an overlap portion of said tab and said separators, and at least a part of said overlap portion on said tab includes said protective layer. According to the battery including the join part configured as described above, it is possible by the join part to suitably suppress the vibration capable of being added to the electrode tab, and thus it is preferable.

DETAILED DESCRIPTION

Below, while referring to drawings, some preferred embodiments of the herein disclosed technique will be explained. Incidentally, the matters other than matters particularly mentioned in this specification, and required for practicing the present disclosure (for example, a general configuration and manufacturing process for the battery by which the present disclosure is not characterized) can be grasped as design matters of those skilled in the art based on the conventional technique in the present field. The present disclosure can be executed based on the contents disclosed in the present specification, and the technical common sense in the present field. The below described explanation is not intended to restrict the herein disclosed technique to the below described embodiments. Additionally, in the present specification, a phrase "A to B" representing a numerical value range means a matter being equal to or more than A and not more than B. Therefore, it semantically covers a case of being more than A and less than B.

Incidentally, in the present specification, the "battery" is a term widely denoting an electric storage device capable of taking out the electric energy, and is a concept containing the primary battery and the secondary battery. In addition, in the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor.

In addition, below, it will be described about a case where a first electrode is used as a positive electrode, but the present disclosure is not restricted to this. The herein disclosed technique can be applied to a case, for example, where the first electrode is used as a negative electrode.

Figure 1:
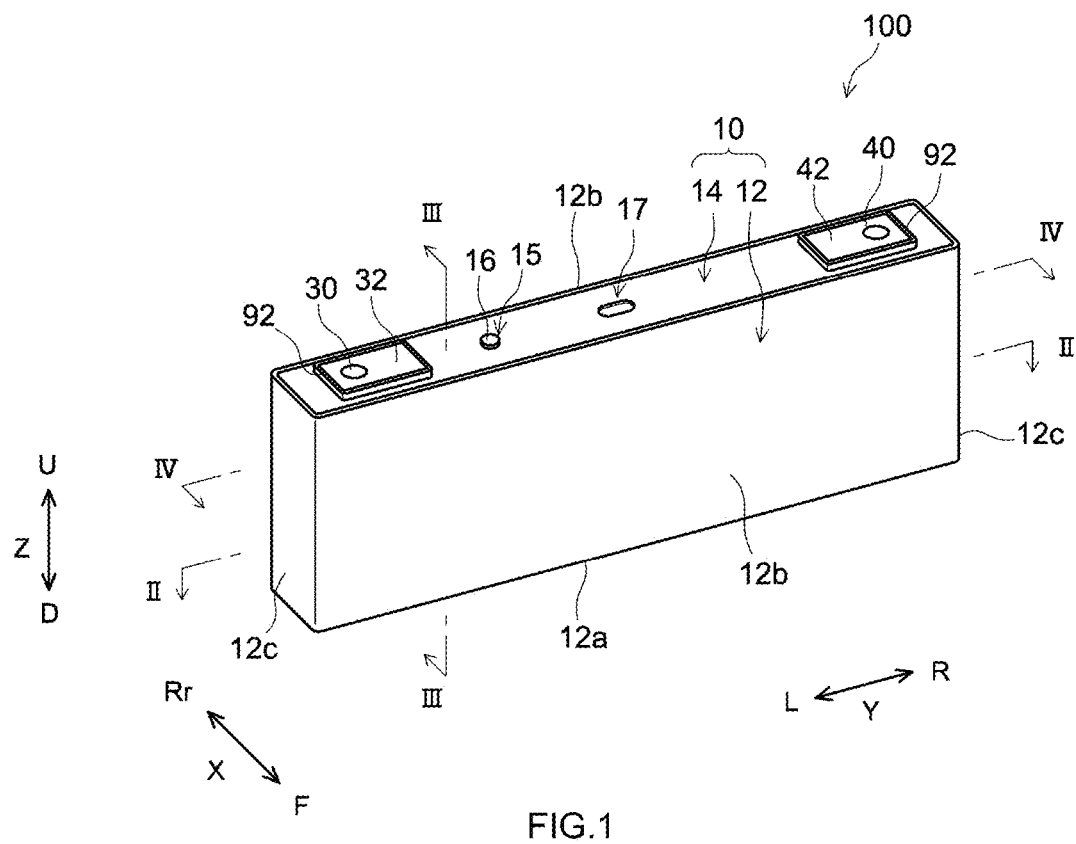
FIG. 1 is a perspective view that schematically shows a battery in accordance with Embodiment 1.
Figure 2:
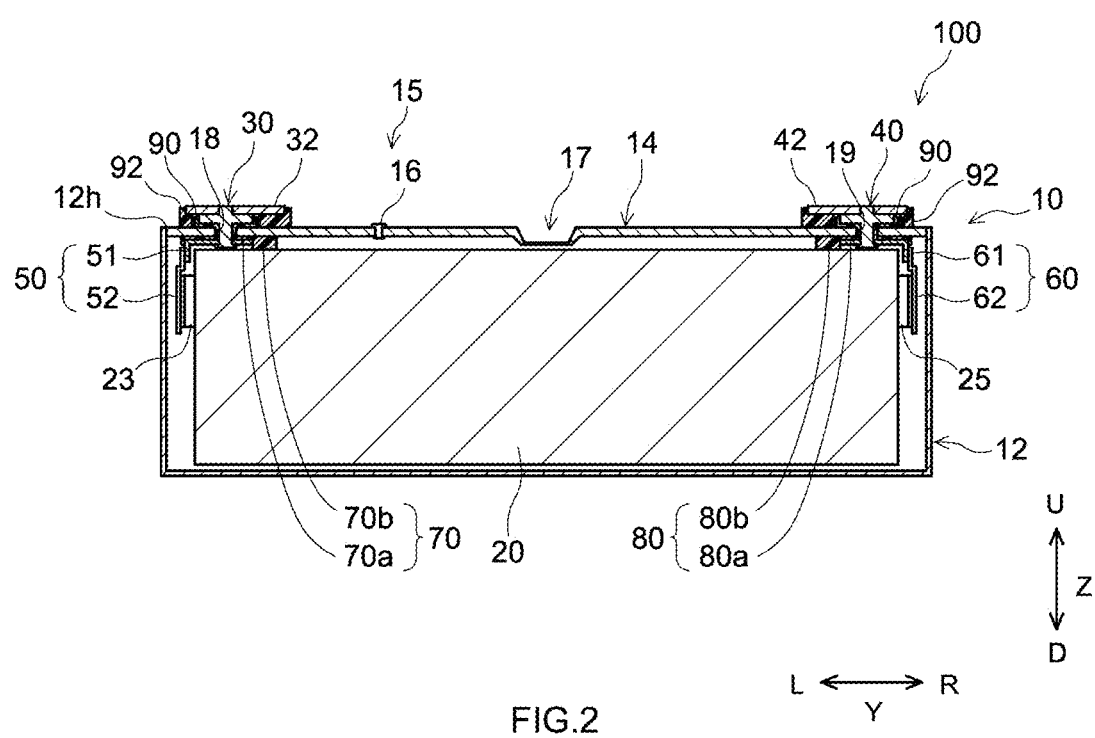
FIG. 2 is a longitudinal cross section view that is schematically shown along a II-II line of FIG. 1.
Figure 3:
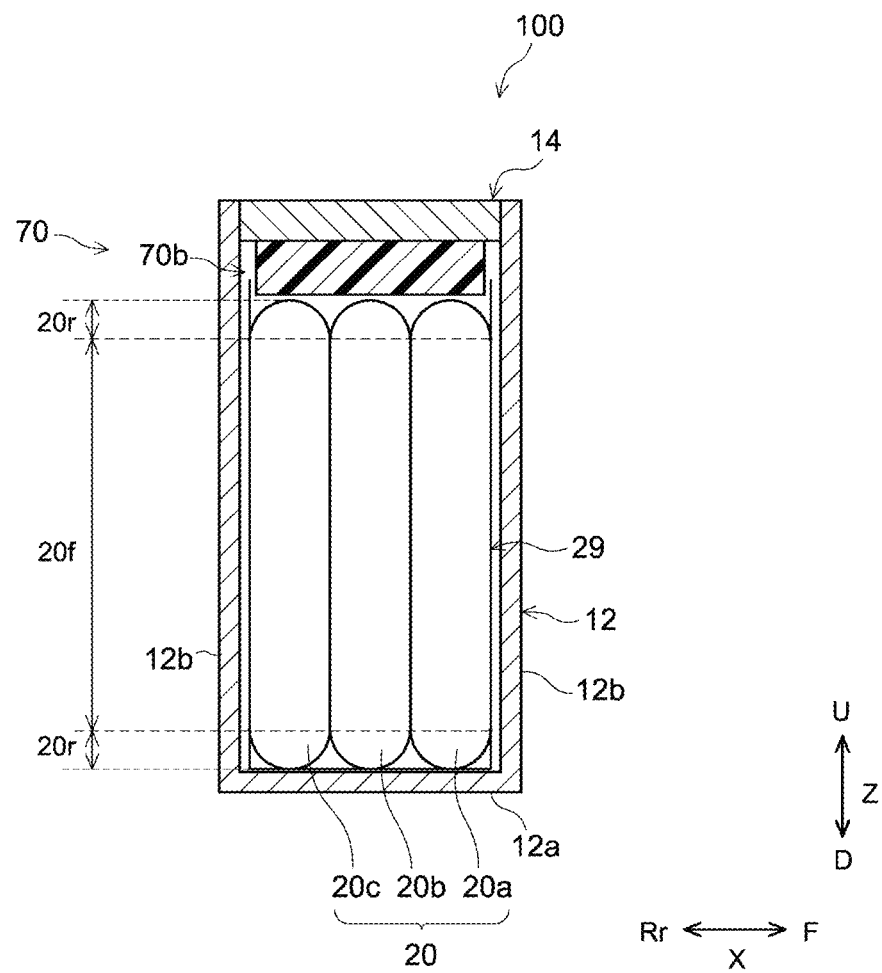
FIG. 3 is a longitudinal cross section view that is schematically shown along a III-III line of FIG. 1.
Figure 4:
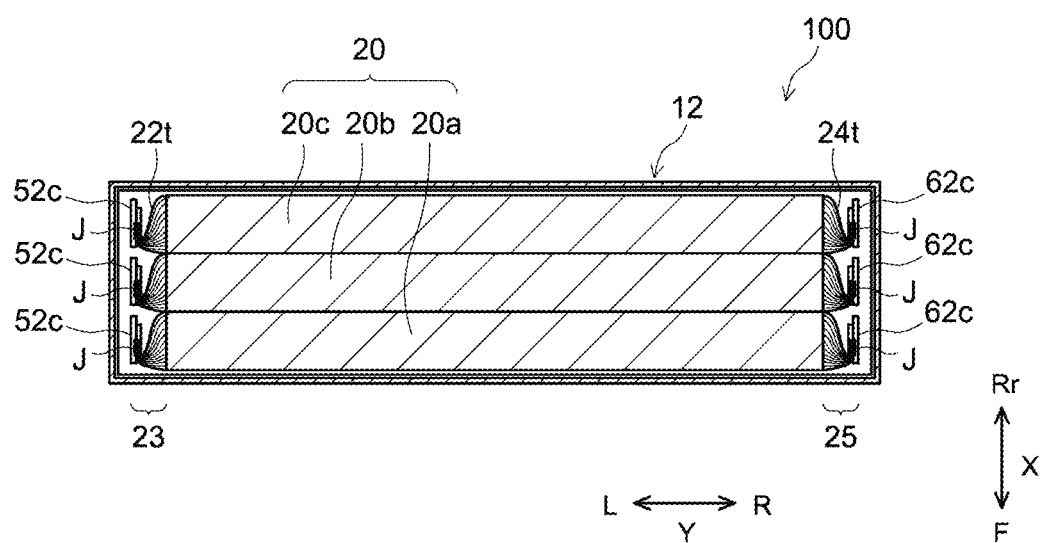
FIG. 4 is a lateral cross section view that is schematically shown along a IV-IV line of FIG. 1.

At first, a configuration of a battery 100 in accordance with the present embodiment will be described. FIG. 1 is a perspective view of the battery 100. FIG. 2 is a longitudinal cross section view that is schematically shown along a II-II line of FIG. 1. FIG. 3 is a longitudinal cross section view that is schematically shown along a III-III line of FIG. 1. FIG. 4 is a lateral cross section view that is schematically shown along a IV-IV line of FIG. 1. In the explanation described below, reference signs L, R, F, Rr, U. and D in drawings respectively represent left, right, front, rear, up, and down, and reference signs X, Y, and Z in drawings respectively represent a short side direction, a long side direction orthogonal to the short side direction (referred to as longitudinal direction of the electrode body, too), and a vertical direction of the battery 100. However, these are merely directions for convenience sake of explanation, which never restrict the disposed form of the battery 100.

As shown in FIG. 2, the battery 100 includes a battery case 10 and an electrode body (here, electrode body group 20). In addition, the battery 100 in accordance with the present embodiment includes not only the battery case 10 and the electrode body group 20, but also a positive electrode terminal 30, a positive electrode outside conductive member 32, a negative electrode terminal 40, a negative electrode outside conductive member 42, an outside insulating member 92, a positive electrode electrical collector part 50, a negative electrode electrical collector part 60, a positive electrode inside insulating member 70, and a negative electrode inside insulating member 80. In addition, as the illustration is omitted, the secondary battery 100 in accordance with the present embodiment further includes an electrolyte. The battery 100 here is a lithium ion secondary battery. An inside resistance of the battery 100 could be, for example, about 0.2 to 2.0 mΩ.

The battery case 10 is a housing that is configured to accommodate the electrode body group 20. The battery case 10 has an outer appearance that is formed in a flat and bottomed rectangular parallelopiped shape (square shape). A material of the battery case 10 might be the same as a material conventionally used, and is not particularly restricted. It is preferable that the battery case 10 is made of metal, and it is more preferable that, for example, the battery case is made of aluminum, aluminum alloy, iron, iron alloy, or the like. In addition, the battery case 10 includes an outer package 12, a sealing plate 14, and a gas exhaust valve 17. The outer package 12 is a container formed in a flat square shape whose one surface is an opening part 12h. In particular, as shown in FIG. 1, the outer package 12 includes a bottom wall 12a that is formed in an approximately rectangular shape, a pair of first side walls 12b that extend upward U from a short side of the bottom wall 12a and that are opposed mutually, and a pair of second side walls 12c that extend upward U from a long side of the bottom wall 12a and that are opposed mutually. An area of the first side wall 12b is larger than an area of the second side wall 12c. Then, the opening part 12h is formed at an upper surface of the outer package 12 surrounded by the above-described pair of first side walls 12b and the above-described pair of second side walls 12c. The sealing plate 14 is attached to the outer package 12 so as to cover the opening part 12h of the outer package 12. The sealing plate 14 is a plate member formed to have an approximately rectangular shape in a plane view. The sealing plate 14 is opposed to the bottom wall 12a of the outer package 12. The battery case 10 is formed by joining (for example, welding-joining) the sealing plate 14 to a peripheral edge of the opening part 12h of the outer package 12. Joining the sealing plate 14 can be performed, for example, by welding, such as laser welding.

As shown in FIG. 1 and FIG. 2, the gas exhaust valve 17 is formed on the sealing plate 14. The gas exhaust valve 17 is configured to be opened when a pressure inside the battery case 10 becomes equal to or more than a predetermined value, and to exhaust gas that exists inside the battery case 10. Further, on the sealing plate 14, a liquid injection hole 15 and two terminal insert holes 18, 19 are provided in addition to the gas exhaust valve 17. The liquid injection hole 15 communicates with an internal space of the outer package 12 and is an opening provided for performing liquid injection of the electrolyte at a manufacturing step of the battery 100. The liquid injection hole 15 is sealed by a sealing member 16. As the sealing member 16 described above, for example, a blind rivet is suitable. By doing this, it is possible to firmly fix the sealing member 16 at the inside of the battery case 10.

Figure 5:
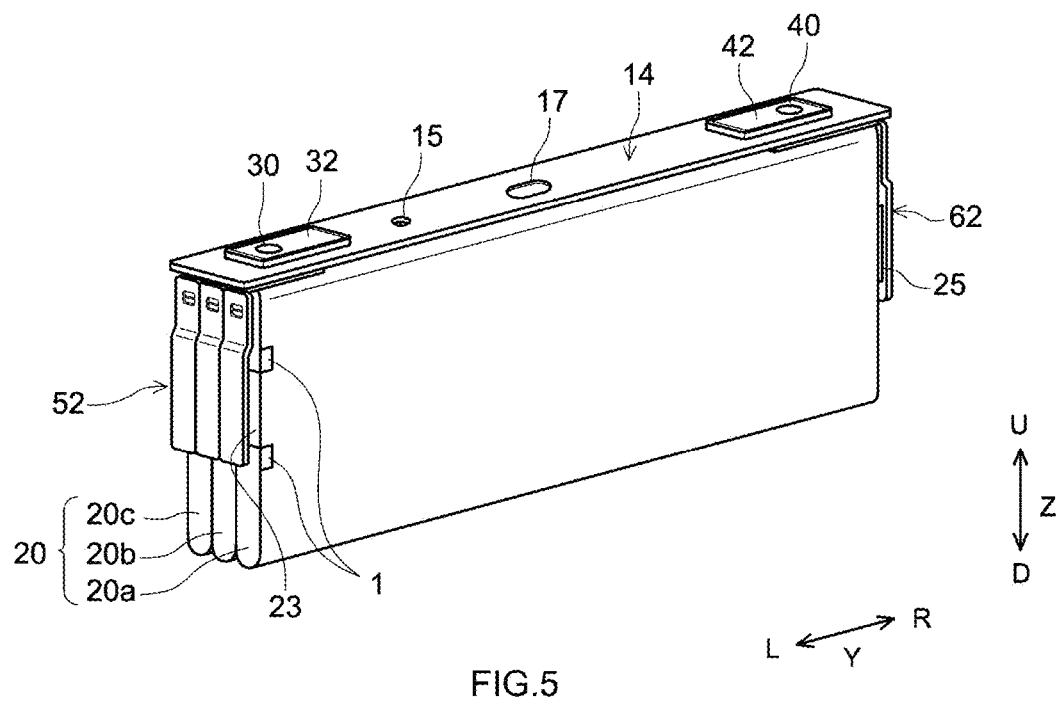
FIG. 5 is a perspective view that schematically shows an electrode body group attached to a sealing plate.

FIG. 5 is a perspective view that schematically shows an electrode body group 20 attached to the sealing plate 14 before fitting. In the present embodiment, a plurality of (here, three) electrode bodies 20a, 20b, 20c are accommodated inside the battery case 10. Incidentally, the number of the electrode bodies accommodated inside one battery case 10 is not particularly restricted, and might be 1 or might be equal to or more than 2 (plural). As shown in FIG. 2, a positive electrode electrical collector part 50 is arranged at one side (left side in FIG. 2) in a long side direction Y of each electrode body and a negative electrode electrical collector part 60 is arranged at the other side (right side in FIG. 2) in the long side direction Y. Then, each of the electrode bodies 20a, 20b, 20c is connected in parallel. However, the electrode bodies 20a, 20b, 20c might be connected in series. The electrode body 20a is accommodated inside the outer package 12 of the battery case 10 in a state of being covered by an electrode body holder 29 (see FIG. 3) made of resin sheet here. Additionally, as shown in FIG. 5, the battery 100 in accordance with the present embodiment is configured to include the separator 26 on which a join part 1 is formed, and this separator is unevenly distributed at a portion where a bend of the positive electrode tab group 23 is softer (in other words, folded and bent part of the positive electrode tab group 23). Incidentally, the details of the separator 26 on which the join part 1 is formed will be described later.

Figure 6:
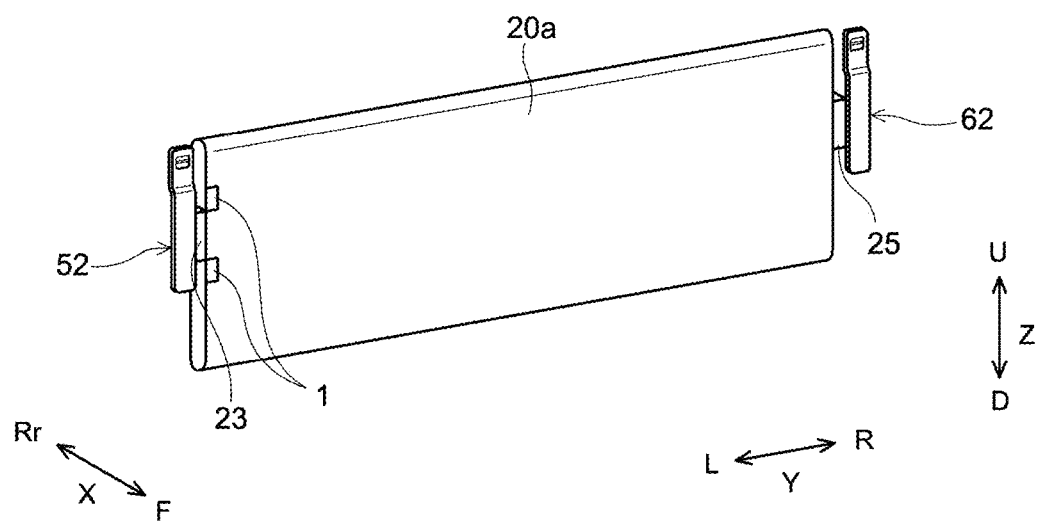
FIG. 6 is a perspective view that schematically shows an electrode body to which a positive electrode second electrical collector part and a negative electrode second electrical collector part are attached.
Figure 7:
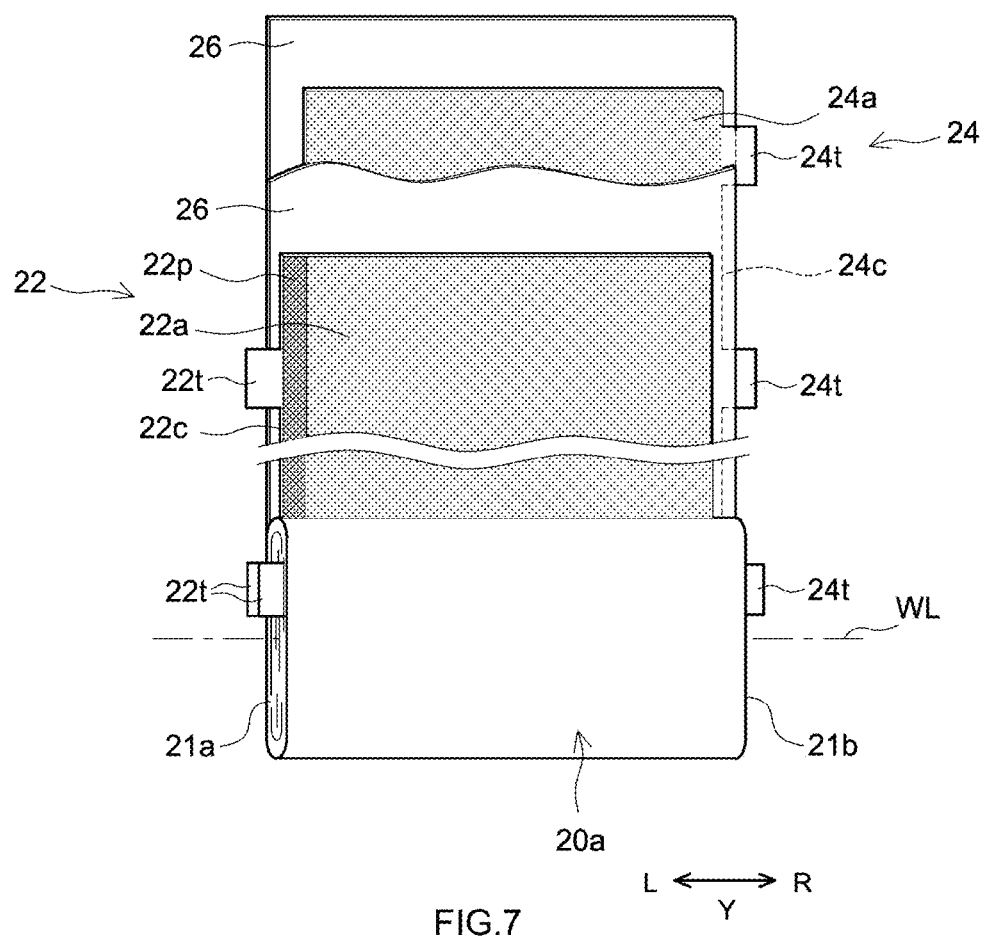
FIG. 7 is a schematic view that shows a configuration of a wound electrode body.

FIG. 6 is a perspective view that schematically shows the electrode body 20a. FIG. 7 is a schematic view that shows a configuration of the electrode body 20a. Incidentally, although details will be explained below with the electrode body 20a used as an example, similar configuration can be applied to the electrode bodies 20b, 20c.

As shown in FIG. 7, the electrode body 20a includes a positive electrode 22, a negative electrode 24, and a separator 26. The electrode body 20a here is a wound electrode body in which a positive electrode 22 formed in a strip-like shape and a negative electrode 24 formed in a strip-like shape are laminated via two strip-like shaped separators 26 and wound therein about a winding axis WL being as a center. The wound electrode body as described above includes a positive-negative electrode laminate structure in which the positive electrode 22 and the negative electrode 24 are overlapped via the separator 26 at multiple times. However, the structure of the electrode body does not restrict the technique herein disclosed. For example, the electrode body might be a laminate electrode body in which a plurality of square shaped (typically, rectangular) positive electrodes and a plurality of square shaped (typically, rectangular) negative electrodes are stacked in a state of being insulated.

The electrode body 20a has a flat shape. The electrode body 20a is arranged inside the outer package 12 with the winding axis WL being in a direction approximately parallel to the long side direction Y. In particular, as shown in FIG. 3, the electrode body 20a includes a pair of bent parts (R parts) 20r that are opposed to the bottom wall 12a of the outer package 12 and the sealing plate 14, and includes a flat part 20f that couples the pair of bent parts 20r and is opposed to the second side wall 12c of the outer package 12. The flat part 20f is configured to extend along the second side wall 12c.

As shown in FIG. 7, the positive electrode 22 includes a positive electrode electrical collector body 22c, and includes a positive electrode active material layer 22a and a positive electrode protective layer 22p, each of which is fixed at least one surface of the positive electrode electrical collector body 22c. However, the positive electrode protective layer 22p is not essential, and might be omitted in another embodiment. The positive electrode electrical collector body 22c is formed in a strip-like shape. The positive electrode electrical collector body 22c, for example, consists of an electrically conductive metal, such as aluminum, aluminum alloy, nickel, and stainless steel. The positive electrode electrical collector body 22c here is a metal foil, in particular, an aluminum foil.

Figure 10:
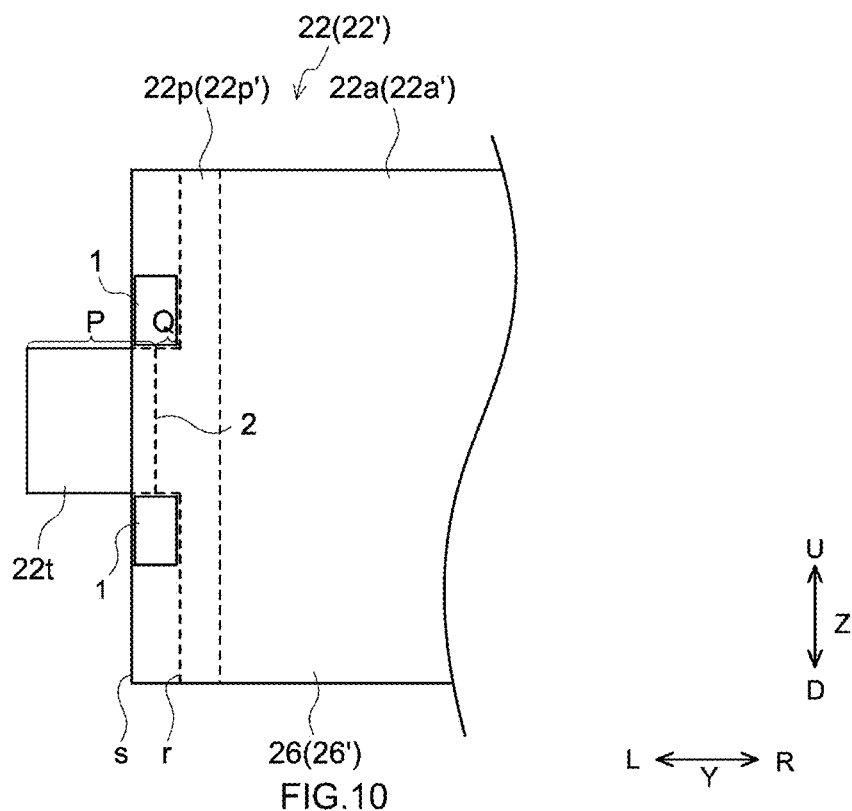
FIG. 10 is a schematic view that shows configurations of a separator 26' and a positive electrode 22' of FIG. 8.

At one end part 21a (left end part in FIG. 7) in the long side direction Y of the positive electrode electrical collector body 22c, a plurality of positive electrode tabs 22t are provided. The plurality of positive electrode tabs 22t are provided at intervals (intermittently) along a longitudinal direction of the strip-like shaped positive electrode 22. The plurality of positive electrode tabs 22t protrude, toward one side (left side in FIG. 7) in an axial direction of the winding axis WL, to an outside more than the separator 26. Incidentally, the positive electrode tabs 22t might be provided at the other side (right side in FIG. 7) in the axial direction of the winding axis WL, or might be provided at both sides in the axial direction of the winding axis WL. The positive electrode tab 22t is a part of the positive electrode electrical collector body 22c and consists of a metal foil (aluminum foil). However, the positive electrode tab 22t might be a member different from the positive electrode electrical collector body 22c. The positive electrode tab 22t here is formed in a rectangular shape, but the positive electrode tab is not restricted to this and might be formed in various shapes, for example, a trapezoidal shape, or the like. The positive electrode tab 22t includes a forming area Q where the positive electrode protective layer 22p is formed, and includes a tab exposed area P where the positive electrode active material layer 22a and the positive electrode protective layer 22p are failed to be formed and the positive electrode electrical collector body 22c is exposed. In addition, the boundary portion 2 of FIG. 10 represents a boundary portion between the forming area Q and the tab exposed area P. Incidentally, in the present embodiment, only the positive electrode protective layer 22p is formed on the positive electrode tab 22t, but the present disclosure is not restricted to this, and the positive electrode active material layer and the positive electrode protective layer might be formed on the positive electrode tab. In that case, an area where the positive electrode protective layer is formed can be treated as the forming area.

As shown in FIG. 4, the plurality of positive electrode tabs 22t are laminated at one end part (left end part in FIG. 4) in the axial direction of the winding axis WL so as to configure a positive electrode tab group 23. The positive electrode tab group 23 includes a plurality of positive electrode tabs 22t that protrude from one end part 21a positioned in a surface direction (Y direction of FIG. 2) along the first side wall 12b. Then, the plurality of positive electrode tabs 22t are folded and bent to align their outer side ends. By doing this, it is possible to enhance accommodation property to the battery case 10 so as to implement miniaturizing the battery 100. As shown in FIG. 2, the positive electrode tab group 23 is electrically connected to the positive electrode terminal 30 via the positive electrode electrical collector part 50. In particular, the positive electrode tab group 23 is joined to the positive electrode electrical collector part 50, in a state that at least a part of a tip end portion of the positive electrode tab group is bent to be arranged along one second side wall 12c among the pair of second side walls 12c. The positive electrode tab group 23 and the positive electrode second electrical collector part 52 are connected at a connecting part J (see FIG. 4). Then, the positive electrode second electrical collector part 52 is electrically connected to the positive electrode terminal 30 via the positive electrode first electrical collector part 51. Incidentally, sizes of the plurality of positive electrode tabs 22t (length along the long side direction Y and width orthogonal to the long side direction Y, see FIG. 7) can be suitably adjusted in consideration of a state of being connected to the positive electrode electrical collector part 50, for example, on the basis of the formed position, or the like. Here, respective sizes of the plurality of positive electrode tabs 22t are mutually different to align the outer side ends when the positive electrode tabs are bent.

As shown in FIG. 7, the positive electrode active material layer 22a is provided in a strip-like shape along the longitudinal direction of the strip-like shaped positive electrode electrical collector body 22c. The positive electrode active material layer 22a contains a positive electrode active substance (for example, lithium transition metal composite oxide, such as lithium-nickel-cobalt-manganese composite oxide) that can reversibly store and release a charge carrier. When a total solid content of the positive electrode active material layer 22a is treated as 100 mass %, the positive electrode active substance might occupy approximately 80 mass % or more, typically 90 mass % or more, or, for example, 95 mass % or more. The positive electrode active material layer 22a might contain an arbitrary component other than the positive electrode active substance, for example, an electrical conducting material, a binder, various additive components, or the like. As the electrical conducting material, for example, a carbon material, such as acetylene black (AB), can be used. As the binder, for example, polyvinylidene fluoride (PVdF), or the like can be used.

The positive electrode protective layer 22p is, as shown in FIG. 7, provided at a boundary part between the positive electrode electrical collector body 22c and the positive electrode active material layer 22a in the long side direction Y. In addition, as shown in FIG. 7, the battery 100 in accordance with the present embodiment includes a boundary portion 2 between the forming area Q on which the positive electrode protective layer 22p is formed and the positive electrode tab exposed area P on which the positive electrode tab 22t is exposed, on the positive electrode tab 22t included by the positive electrode electrical collector body 22c. The positive electrode protective layer 22p here is provided at one end part (left end part in FIG. 7) in the axial direction of the winding axis WL of the positive electrode electrical collector body 22c. However, the positive electrode protective layer 22p might be provided at both end parts in the axial direction. The positive electrode protective layer 22p is provided in a strip-like shape along the positive electrode active material layer 22a The positive electrode protective layer 22p contains an inorganic filler (for example, alumina). When a total solid content of the positive electrode protective layer 22p is treated as 100 mass %, the inorganic filler might occupy approximately 50 mass % or more, typically 70 mass % or more, or, for example, 80 mass % or more. The positive electrode protective layer 22p might contain an arbitrary component other than the inorganic filler, for example, an electrical conducting material, a binder, various additive components, or the like. The electrical conducting material and the binder might be the same as ones illustrated as components capable of being contained in the positive electrode active material layer 22a.

As shown in FIG. 7, the negative electrode 24 includes a negative electrode electrical collector body 24c, and a negative electrode active material layer 24a that is fixed on at least one surface of the negative electrode electrical collector body 24c. Incidentally, at a boundary part between the negative electrode electrical collector body and the negative electrode active material layer in the long side direction Y, a negative electrode protective layer might be further formed. The negative electrode electrical collector body 24c is formed in a strip-like shape. The negative electrode electrical collector body 24c consists of, for example, an electrically conductive metal, such as copper, copper alloy, nickel, and stainless steel. The negative electrode electrical collector body 24c here is a metal foil, in particular, a copper foil.

At one end part 21b (right end part in FIG. 7) in the axial direction of the winding axis WL of the negative electrode electrical collector body 24c, a plurality of negative electrode tabs 24t are provided. The plurality of negative electrode tabs 24t are provided at intervals (intermittently) along a longitudinal direction of the strip-like shaped negative electrode 24. Each of the plurality of negative electrode tabs 24t protrudes, toward one side (right side in FIG. 7) in an axial direction, to an outside more than the separator 26. However, the negative electrode tabs 24t might be provided at the other end part (left end part in FIG. 7) in the axial direction, or might be provided at both end parts in the axial direction. The negative electrode tab 24t is a part of the negative electrode electrical collector body 24c and consists of a metal foil (copper foil). However, the negative electrode tab 24t might be a member different from the negative electrode electrical collector body 24c. The negative electrode tab 24t here is formed in a rectangular shape, but the negative electrode tab is not restricted to this, and might be formed in various shapes, for example, trapezoidal shape, or the like. On at least a part of the negative electrode tab 24t, an area is provided where the negative electrode electrical collector body 24c is exposed as the negative electrode active material layer 24a is not formed.

As shown in FIG. 4, the plurality of negative electrode tabs 24t are laminated at one end part (right end part in FIG. 4) in the axial direction so as to configure a negative electrode tab group 25. The negative electrode tab group 25 includes a plurality of negative electrode tabs 24t that protrude from the end part 21b different from the end part 21a positioned in the surface direction (Y direction of FIG. 2) along the first side wall 12b. It is preferable that the negative electrode tab group 25 is provided at a position symmetrical in the axial direction to the positive electrode tab group 23. Then, the plurality of negative electrode tabs 24t are folded and bent to align their outer side ends. By doing this, it is possible to enhance accommodation property to the battery case 10, so as to implement miniaturizing the battery 100. As shown in FIG. 2, the negative electrode tab group 25 is electrically connected to the negative electrode terminal 40 via the negative electrode electrical collector part 60. In particular, the negative electrode tab group 25 is joined to the negative electrode electrical collector part 60, in a state that at least a part of a tip end portion of the negative electrode tab group is bent to be arranged along one second side wall 12c among the pair of second side walls 12c. The negative electrode tab group 25 and the negative electrode second electrical collector part 62 are connected at the connecting part J (see FIG. 4). Then, the negative electrode second electrical collector part 62 is electrically connected to the negative electrode terminal 40 via the negative electrode first electrical collector part 61. Similarly to the plurality of positive electrode tabs 22t, respective sizes of the plurality of negative electrode tabs 24t are mutually different to align the outer side ends of bent negative electrode tabs.

As shown in FIG. 7, the negative electrode active material layer 24a is provided in a strip-like shape along the longitudinal direction of the strip-like shaped negative electrode electrical collector body 24c. The negative electrode active material layer 24a contains a negative electrode active substance (for example, carbon material, such as graphite) that can reversibly store and release a charge carrier. When a total solid content of the negative electrode active material layer 24a is treated as 100 mass %, the negative electrode active substance might occupy approximately 80 mass % or more, typically 90 mass % or more, or, for example, 95 mass % or more. The negative electrode active material layer 24a might contain an arbitrary component other than the negative electrode active substance, for example, a binder, a dispersing agent, various additive components, or the like. As the binder, for example, rubbers, such as styrene butadiene rubber (SBR) can be used. As the dispersing agent, for example, celluloses, such as carboxymethyl cellulose (CMC) can be used.

Figure 8:
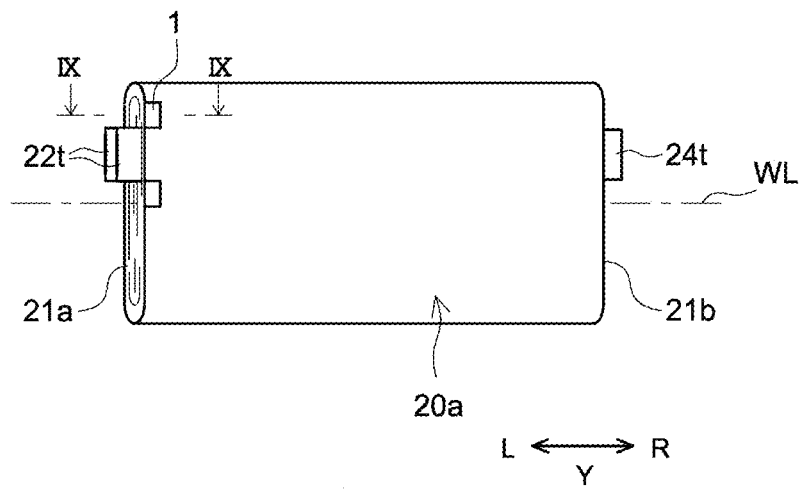
FIG. 8 is a perspective view that schematically shows the electrode body before the positive electrode second electrical collector part and the negative electrode second electrical collector part are attached.
Figure 9:
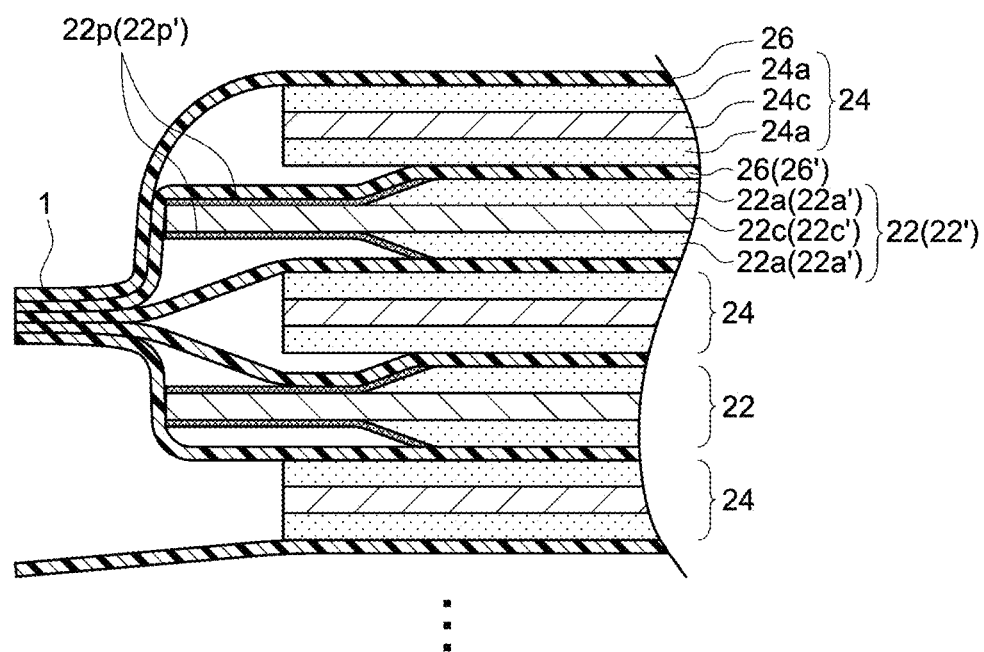
FIG. 9 is a cross section view that is schematically shown along a IX-IX line of FIG. 8.

Next, the join part 1 included by the separator 26 will be described. Here, FIG. 8 is a perspective view that schematically shows the electrode body 20a before the positive electrode second electrical collector part 52 and the negative electrode second electrical collector part 62 are attached. FIG. 9 is a cross section view that is schematically shown along a IX-IX line of FIG. 8. As shown in FIG. 9, in the present embodiment, among the separators 26 configuring the electrode body 20a having the positive-negative electrode laminate structure, 5 sheets (5 layers) of separators are joined to each other. Incidentally, in FIG. 9, among the separators 26 on which the join part 1 is formed, second sheet (second layer) of separator counted from the separator layer disposed at the outermost is treated as 26', and then the positive electrode, the positive electrode electrical collector body, the positive electrode active material layer, and the positive electrode protective layer disposed just below the separator 26' described above are treated as 22', 22c', 22a', and 22p'. Here, in the present embodiment, among the separators 26 configuring the electrode body 20a having the positive-negative electrode laminate structure, 5 sheets (5 layers) of separators are joined to each other, but the number of the joined separators 26 (in other words, the number of the separators 26 on which the join part 1 is formed) is not particularly restricted if the effects of the technique herein disclosed are implemented. The sheet number (layer number) of the joined separators 26 is, from a perspective of suitably dispersing a load on the positive electrode tab 22t to the separators 26, preferably equal to or more than 3 sheets (3 layers), further preferably equal to or more than 10 sheets (10 layers), or furthermore preferably equal to or more than 20 sheets (20 layers). On the other hand, from a perspective of making a folding and bending load be appropriate which can be caused when the positive electrode tab group 23 is folded and bent, the sheet number (layer number) of the separators 26 to be joined is, for example, equal to or less than 90%, preferably equal to or less than 60%, further preferably equal to or less than 40%, or furthermore preferably equal to or less than 30% (for example, equal to or less than 20%), in a case where a total sheet number (total layer number) of the separators 26 configuring the electrode body 20a is treated as 100%. In addition, on the battery 100 in accordance with the present embodiment, the separators 26 on which the join part 1 is formed are unevenly distributed at a portion where the bend of the positive electrode tab group 23 is softer, but the present disclosure is not restricted to this. The separator on which the join part is formed can be disposed at an arbitrary position of the positive-negative electrode laminate structure, if the effects of the technique herein disclosed are implemented.

Figure 11:
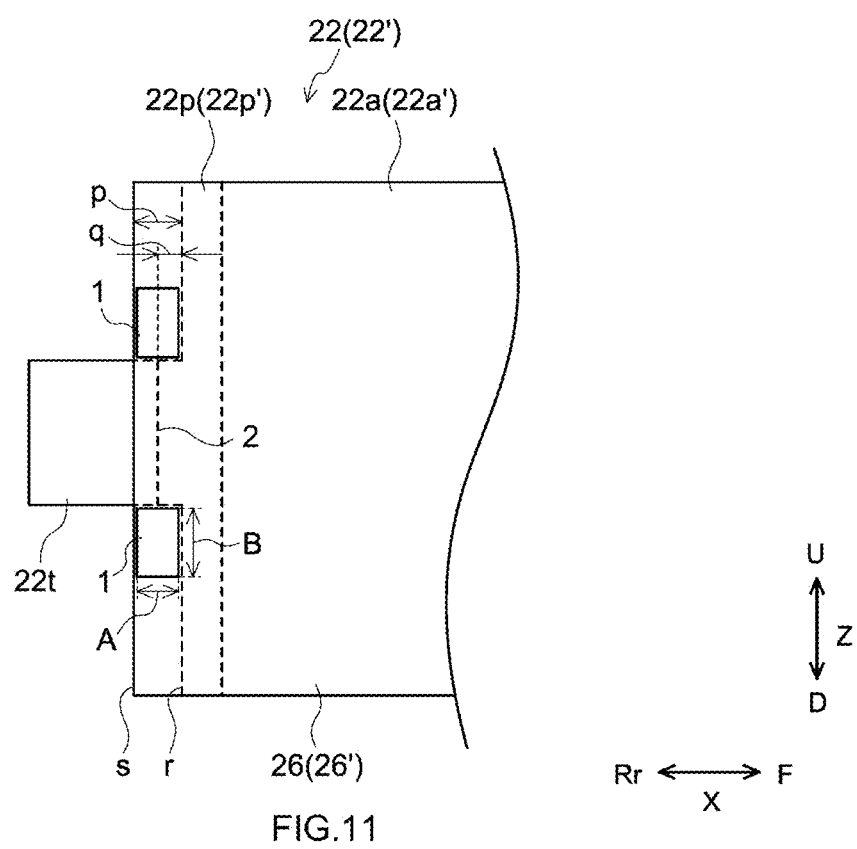
FIG. 11 is a schematic view that shows configurations of the separator 26' and the positive electrode 22' of FIG. 8.

FIG. 10 and FIG. 11 are schematic views (plane views) that show configurations of the separator 26' and the positive electrode 22' of FIG. 8. As shown in FIG. 10, in the present embodiment, the join part 1 is formed on an area from an end part r corresponding to a base portion of the positive electrode tab 22t to an end part s in a protruding direction of the positive electrode tab 22t of the separator 26 (for more details, separator 26'). Additionally, in the present embodiment, at least a part of the join part 1 is disposed at a position adjacent to the boundary portion 2 (in other words, position coming into contact with the boundary portion 2). As described above, by arranging at least a part of the join part 1 at a position adjacent to the boundary portion 2, it is possible to efficiently disperse the load applied on the boundary portion 2 to the separator 26, and thus it is possible to suitably inhibit the damage on the positive electrode tab group 23.

As shown in FIG. 11, in a case where the shortest distance from the end part r to the end part s is represented by p and the shortest distance from the end part r to the boundary portion 2 is represented by q, the shortest distance p and the shortest distance q both are not particularly restricted as far as disclosed herein. A ratio (p/q) of the shortest distance p with respect to the shortest distance q is, from a perspective of suitably securing the area for the join part 1, for example, equal to or more than 1.5, preferably equal to or more than 2, or further preferably equal to or more than 2.5. On the other hand, from a perspective of separator's cost, the above-described ratio (p/q) is, for example, equal to or less than 5, preferably equal to or less than 4, or further preferably equal to or less than 3.

In addition, a ratio (B/A) join part 1 of a length B in a direction (Z direction of FIG. 10) orthogonal to the protruding direction of the positive electrode tab 22t with respect to a length A in the protruding direction (Y direction of FIG. 11) is not particularly restricted if the effects of the technique herein disclosed are implemented. The above-described ratio (B/A) could be, from a perspective of suitably enhancing join strength of separators 26, for example, equal to or more than 1.1, preferably equal to or more than 1.3, or further preferably equal to or more than 1.5. In addition, the above-described ratio (B/A) could be approximately equal to or less than 3, or, for example, equal to or less than 2.

As shown in FIG. 7, the separator 26 is a member that establishes an insulation on the positive electrode active material layer 22a of the positive electrode 22, and the negative electrode active material layer 24a of the negative electrode 24. As the separator 26, for example, it is suitable to use a porous sheet made of resin consisting of polyolefin resin, such as polyethylene (PE) and polypropylene (PP). In addition, the separator 26 might include a base material part consisting of a porous sheet made of resin, and a heat resistance layer (HRL) provided on at least one surface of the base material part and containing an inorganic filler. As the inorganic filler, for example, it is possible to use alumina, boehmite, water oxidation aluminum, titania, or the like. Alternatively, the separator 26 might include a base material part that consists of a porous sheet made of resin, and include an adhesion layer provided at least one surface of the base material part. As the adhesion layer, for example, a layer containing PVdF or SBR can be used. In addition, the above-described adhesion layer might further include other components, such as inorganic filler. As one example of the above-described inorganic filler, one as previously mentioned can be used. Here, in a case where the whole of the components configuring the above-described adhesion layer is treated as 100 mass %, the content amount of PVdF can be approximately equal to or more than 5 mass %, preferably equal to or more than 10 mass %, further preferably equal to or more than 15 mass %, or furthermore preferably equal to or more than 20 mass %. In addition, the content amount of PVdF might be 100 mass %, for example, can be equal to or less than 90 mass %, or can be preferably equal to or less than 80 mass %. However, the content amount of PVdF is not restricted to this. Incidentally, although the details would be described later, in a case where the separator 26 and another separator are joined to each other by heat press according to the present embodiment, it is possible to preferably use a separator that includes a base material part consisting of a porous resin sheet and includes an adhesion layer provided on at least one surface of the base material part.

The electrolyte might be similar to conventional one, and is not particularly restricted. The electrolyte is, for example, a nonaqueous electrolyte containing a nonaqueous type solvent and a supporting salt. The nonaqueous type solvent contains, for example, carbonates, such as ethylene carbonate, dimethyl carbonate, and ethyl methyl carbonate. The supporting salt is, for example, a fluorine-containing lithium salt, such as $LiPF_6$. However, the electrolyte might be in a solid shape (solid electrolyte) and might be integrated with the electrode body group 20.

The positive electrode terminal 30 is, as shown in FIG. 2, inserted into a terminal insert hole 18 that is formed at one end part (left end part in FIG. 2) in a long side direction Y of the sealing plate 14. It is preferable that the positive electrode terminal 30 is made of metal, and it is more preferable that the positive electrode terminal is made of, for example, aluminum or aluminum alloy. On the other hand, the negative electrode terminal 40 is inserted into a terminal insert hole 19 that is formed at the other end part (right end part in FIG. 2) in the long side direction Y of the sealing plate 14. Incidentally, it is preferable that the negative electrode terminal 40 is made of metal, and it is more preferable that the negative electrode terminal is made of, for example, copper or copper alloy. These electrode terminals (positive electrode terminal 30, and negative electrode terminal 40) here protrude from the same surface (in particular, sealing plate 14) of the battery case 10. However, the positive electrode terminal 30 and the negative electrode terminal 40 might respectively protrude from different surfaces of the battery case 10. In addition, it is preferable that the electrode terminals (positive electrode terminal 30, and negative electrode terminal 40) inserted into the terminal insert holes 18, 19 are fixed to the sealing plate 14 by a caulking process or the like.

As described above, the positive electrode terminal 30 is, while shown in FIG. 2, electrically connected to the positive electrode 22 (see FIG. 7) of each electrode body 20 via the positive electrode electrical collector part 50 (positive electrode first electrical collector part 51, and positive electrode second electrical collector part 52) inside the outer package 12. The positive electrode terminal 30 is insulated from the sealing plate 14 by the positive electrode inside insulating member 70 and the gasket 90. Incidentally, the positive electrode inside insulating member 70 includes a base part 70a disposed between the positive electrode first electrical collector part 51 and the sealing plate 14, and includes a protrude part 70b. Then, the positive electrode terminal 30 exposed to the outside of the battery case 10 through the terminal insert hole 18 is connected to the positive electrode outside conductive member 32 at the outside of the sealing plate 14. On the other hand, the negative electrode terminal 40 is, as shown in FIG. 2, electrically connected to the negative electrode 24 (see FIG. 7) of each electrode body via the negative electrode electrical collector part 60 (negative electrode first electrical collector part 61, and negative electrode second electrical collector part 62) inside the outer package 12. The negative electrode terminal 40 is insulated from the sealing plate 14 by the negative electrode inside insulating member 80 and the gasket 90. Incidentally, similarly to the positive electrode inside insulating member 70, the negative electrode inside insulating member 80 also includes a base part 80a disposed between the negative electrode first electrical collector part 61 and the sealing plate 14, and includes a protrude part 80b. Then, the negative electrode terminal 40 exposed to the outside of the battery case 10 through the terminal insert hole 19 is connected to the negative electrode outside conductive member 42 at the outside of the sealing plate 14. Then, between the above described outside conductive member (positive electrode outside conductive member 32, and negative electrode outside conductive member 42) and the sealing plate 14, the outside insulating member 92 is disposed. By the outside insulating member 92 as described above, it is possible to insulate the outside conductive members 32, 42 and the sealing plate 14.

<Manufacturing Method of Battery>

The battery 100 can be manufactured by preparing the battery case 10 (outer package 12 and sealing plate 14) as described above, the electrode body group 20 (electrode bodies 20a, 20b, 20c), the electrolyte, the positive electrode terminal 30, the negative electrode terminal 40, the positive electrode electrical collector part 50 (positive electrode first electrical collector part 51, and positive electrode second electrical collector part 52), the negative electrode electrical collector part 60 (negative electrode first electrical collector part 61, negative electrode second electrical collector part 62), the positive electrode inside insulating member 70, and the negative electrode inside insulating member 80, and by a manufacturing method that includes, for example, a first attaching step, a second attaching step, an inserting step, and a sealing step. In addition, the herein disclosed manufacturing method might further include other steps at arbitrary stages.

Figure 12:
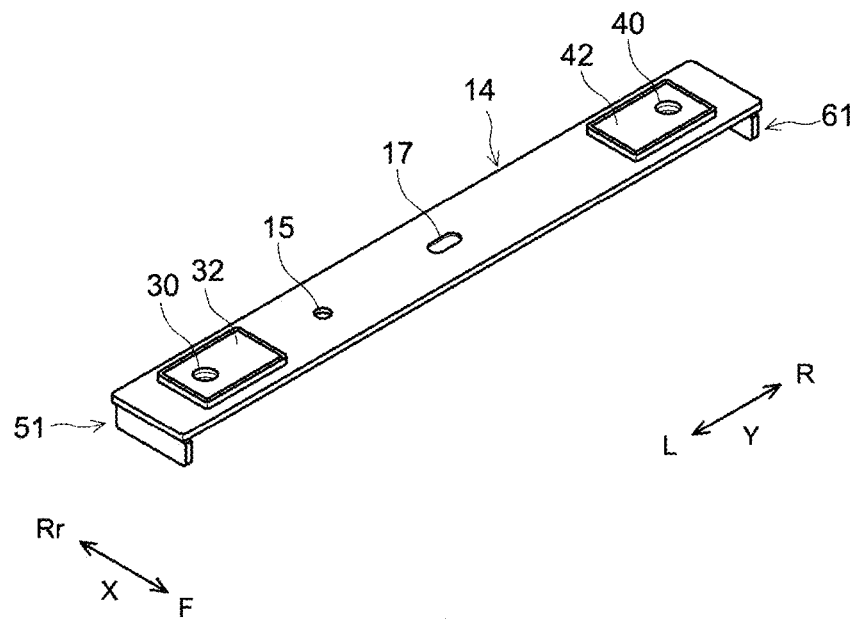
FIG. 12 is a perspective view that schematically shows a sealing plate to which a positive electrode terminal, a negative electrode terminal, the positive electrode first electrical collector part, the negative electrode first electrical collector part, a positive electrode insulating member, and a negative electrode insulating member are attached.
Figure 13:
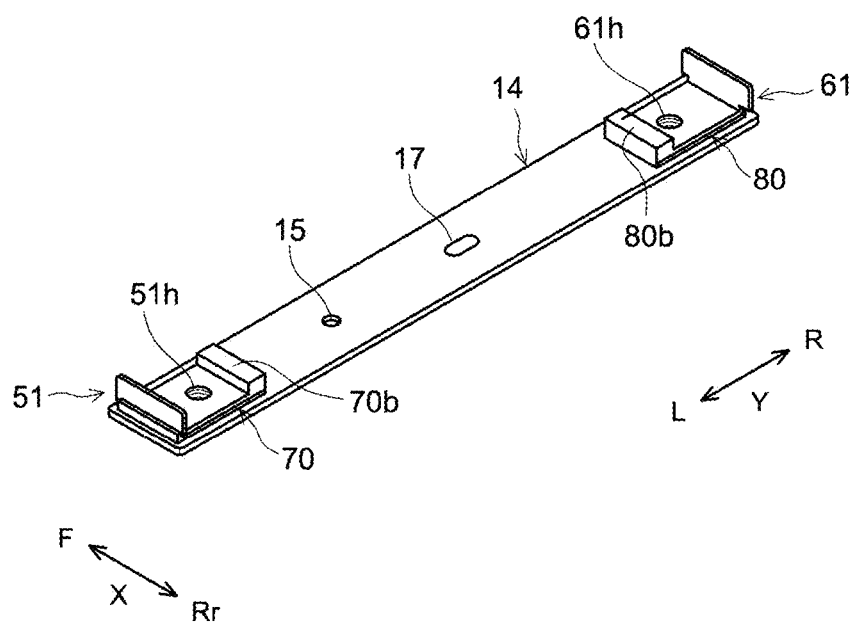
FIG. 13 is a perspective view in which the sealing plate of FIG. 12 is reversed.

At the first attaching step, a first combined product as shown in FIG. 12 and FIG. 13 is manufactured. In particular, at first, the positive electrode terminal 30, the positive electrode first electrical collector part 51, the positive electrode inside insulating member 70, the negative electrode terminal 40, the negative electrode first electrical collector part 61, and the negative electrode inside insulating member 80 are attached to the sealing plate 14.

The positive electrode terminal 30, the positive electrode first electrical collector part 51, and the positive electrode inside insulating member 70 are fixed to the sealing plate 14, for example, by a caulking process (riveting). The caulking process is performed, while the gasket 90 is sandwiched between the outside surface of the sealing plate 14 and the positive electrode terminal 30 and furthermore the positive electrode inside insulating member 70 is sandwiched between the inside surface of the sealing plate 14 and the positive electrode first electrical collector part 51. Incidentally, a material of the gasket 90 might be similar to a material of the positive electrode inside insulating member 70. For more details, the positive electrode terminal 30 before the caulking process is inserted from an upward of the sealing plate 14 into the penetration hole of the gasket 90, the terminal insert hole 18 of the sealing plate 14, the penetration hole of the positive electrode inside insulating member 70, and the penetration hole 51h of the positive electrode first electrical collector part 51 in this order so as to be protruded to a downward of the sealing plate 14. Then, to add compression force with respect to the vertical direction Z, caulking is performed on a portion of the positive electrode terminal 30 protruding to the downward more than the sealing plate 14. Thus, a caulked part is formed at a tip end part (lower end part in FIG. 2) of the positive electrode terminal 30.

By the caulking process as described above, the gasket 90, the sealing plate 14, the positive electrode inside insulating member 70, and the positive electrode first electrical collector part 51 are integrally fixed to the sealing plate 14 and the terminal insert hole 18 is sealed. Incidentally, the caulked part might be welded and joined to the positive electrode first electrical collector part 51. By doing this, it is possible to furthermore enhance the conduction reliability.

Fixing the negative electrode terminal 40, the negative electrode first electrical collector part 61, and the negative electrode inside insulating member 80 can be implemented similarly to fixing at the above-described positive electrode side. In other words, the negative electrode terminal 40 before the caulking process is inserted from an upward of the sealing plate 14 into the penetration hole of the gasket, the terminal insert hole 19 of the sealing plate 14, the penetration hole of the negative electrode inside insulating member 80, and the penetration hole 61h of the negative electrode first electrical collector part 61 in this order so as to be protruded to a downward of the sealing plate 14. Then, to add compression force with respect to the vertical direction Z, caulking is performed on a portion of the negative electrode terminal 40 protruding to the downward more than the sealing plate 14. Thus, a caulked part is formed at a tip end part (lower end part in FIG. 2) of the negative electrode terminal 40.

Next, the positive electrode outside conductive member 32 and the negative electrode outside conductive member 42 are attached to an outside surface of the sealing plate 14 via the outside insulating member 92. Incidentally, a material of the outside insulating member 92 might be similar to a material of the positive electrode inside insulating member 70. In addition, a timing for attaching the positive electrode outside conductive member 32 and the negative electrode outside conductive member 42 might be after the inserting step (for example, after the liquid injection hole 15 is sealed).

At the second attaching step, the first combined product manufactured at the first attaching step is used to manufacture a second combined product as shown in FIG. 5. In other words, the electrode body group 20 integrated with the sealing plate 14 is manufactured. At first, it will be described about manufacture of the electrode body 20a, which is included by the electrode body group 20, including the join part 1. Incidentally, a manufacturing method of the electrode body 20a will be explained below as an example, but it is possible to similarly manufacture the electrode bodies 20b, 20c, too.

At first, the electrode body 20a as shown in FIG. 7 is prepared. The electrode body 20a as described above can be manufactured on the basis of a conventionally known manufacturing method for this type of wound electrode body. Next, a part of separators among the separators 26 configuring the electrode body 20a are joined to each other. As described above, here, the separators 26 whose orders are not more than 5th (5th layer) counted from a softer bend separator when the positive electrode tab group 23 are folded and bent, among the separators 26 configuring the electrode body 20a including the positive-negative electrode laminate structure, are joined to each other.

Figure 14:
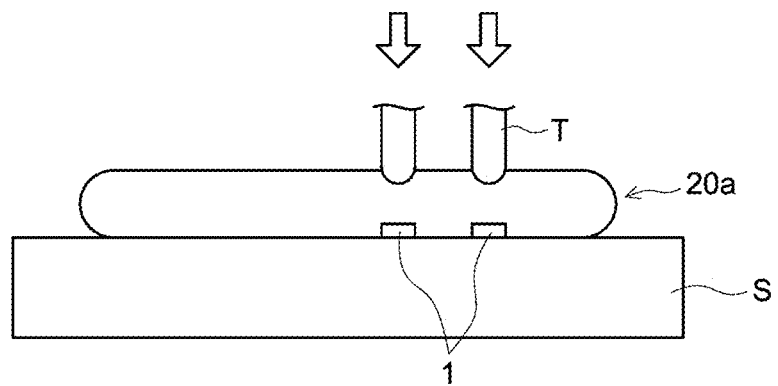
FIG. 14 is an explanation view that is for schematically explaining a forming method of a join part included by the battery in accordance with Embodiment 1.

Here, FIG. 14 is a schematic view that is for explaining a forming method of the join part 1. Incidentally, in FIG. 14, the positive electrode tab group 23 is omitted for facilitating explanation. As shown in FIG. 14, in the present embodiment, by performing heat press on the electrode body 20a manufactured as described above, the above-described 5 sheets (5 layers) of separators 26 are joined to each other. In particular, by arranging the electrode body 20a on an anvil S heated to a predetermined temperature and then by using a horn T so as to press a portion corresponding to the join part 1, the above-described 5 sheets (5 layers) of separators 26 are joined to each other at the join part 1. Incidentally, the sheet number (layer number) of the joined separators can be adjusted, for example, by heating temperature or heating time of the anvil S, press pressure of the horn T. or the like. It is preferable that a condition for the heating temperature as described above, heating time, press pressure of horn, or the like is suitably adjusted on the basis of materials configuring the separator, or the like. Then, the condition described above can be suitably decided by making a person skilled in the art perform a preliminary test, or the like.

Then, regarding the electrode body 20a being manufactured as described above and including the join part 1, three of the electrode bodies 20a (see FIG. 6) each provided with the positive electrode second electrical collector part 52 and with the negative electrode second electrical collector part 62 are prepared as the electrode bodies 20a, 20b. 20c to be arranged so as to be aligned in a short side direction X. At that time, any of the electrode bodies 20a, 20b, 20c might be arranged in parallel so as to make the positive electrode second electrical collector part 52 be arranged at one side (left side of FIG. 5) in the long side direction Y and the negative electrode second electrical collector part 62 be arranged at the other side (right side of FIG. 5) in the long side direction Y.

Next, while the plurality of positive electrode tabs 22t are in a state of being bent as shown in FIG. 4, the positive electrode first electrical collector part 51 fixed to the sealing plate 14 and each positive electrode second electrical collector part 52 of the electrode bodies 20a, 20b, 20c are joined. In addition, while the plurality of negative electrode tabs 24*t* are in a state of being bent, the negative electrode first electrical collector part 61 fixed to the sealing plate 14 and each negative electrode second electrical collector part 62 of the electrode bodies 20*a*, 20*b*, 20*c* are joined. As the joining method, for example, it is possible to use welding, such as ultrasonic welding, resistance welding, and laser welding. Particularly, it is preferable to use welding with the high energy ray irradiation, such as laser. By the welding process as described above, a join part is formed on each of a recessed part of the positive electrode second electrical collector part 52 and a recessed part of the negative electrode second electrical collector part 62.

At the inserting step, the second combined product manufactured at the second attaching step is accommodated in an internal space of the outer package 12. In particular, at first, a resin sheet consisting of a resin material, such as polyethylene (PE), and having an insulating property is folded and bent in a bag shape or a box shape, so as to prepare the electrode body holder 29. Next, the electrode body group 20 is accommodated in the electrode body holder 29. Then, the electrode body group 20 covered by the electrode body holder 29 is inserted into the outer package 12. When the weight of the electrode body group 20 is heavy, or is approximately equal to or more than 1 kg, for example, equal to or more than 1.5 kg, or furthermore 2 to 3 kg, it is preferable that arrangement is performed to make the longer side wall 12*b* of the outer package 12 cross the gravity direction (making outer package 12 be sideways) and then the electrode body group 20 is inserted into the outer package 12.

At the sealing step, the sealing plate 14 is joined to the edge part of the opening 12*h* of the outer package 12 so as to seal the opening 12*h*. The sealing step can be performed at the same time with the inserting step or after the inserting step. At the sealing step, it is preferable that the outer package 12 and the sealing plate 14 are welded and joined. Welding and joining the outer package 12 and the sealing plate 14 can be implemented, for example, by laser welding, or the like. Then, by injecting the electrolyte from the liquid injection hole 15 and covering the liquid injection hole 15 with the sealing member 16, the battery 100 is sealed. As described above, it is possible to manufacture the battery 100.

The battery 100 can be used for various purposes, and it is possible to suitably use the battery for a purpose, for example, in which an external force, such as vibration and impact, might be applied during use, and thus, for example, it is possible to suitably use the battery as a power source (power supply for driving) for a motor mounted on a movable body (typically a vehicle, such as passenger car and truck). The kind of the vehicle is not particularly restricted, but it is possible to use it, for example, on a plug-in hybrid electric vehicle (PHEV), a hybrid electric vehicle (HEV), a battery electric vehicle (BEV), or the like. Regarding the battery 100, it is also possible to arrange a plurality of batteries 100 in a predetermined arrangement direction and then to apply a load from the arrangement direction by a binding mechanism so as to suitably implement a battery pack.

Above, some embodiments of the present disclosure are explained, but the above described embodiments are merely examples. The present disclosure can be implemented in various other forms. The present disclosure can be executed based on the contents disclosed in the present specification, and the technical common sense in the present field. The technique recited in the appended claims includes variously deformed or changed versions of embodiments that have been illustrated above. For example, one part of the above described embodiment can be replaced with another deformed aspect, and furthermore another deformed aspect can be added to the above described embodiment. In addition, unless a technical feature is explained to be essential, this technical feature can be appropriately deleted.

For example, in the above-described embodiment, the separators are joined only at the positive electrode tab group side, but the present disclosure is not restricted to this. The separators might be joined only at the negative electrode tab group side, or the separators might be joined at the positive electrode tab group side and the negative electrode tab group side. In addition, the sheet number (layer number) of the joined separators at the positive electrode tab group side and the sheet number (layer number) of the joined separators at the negative electrode tab group side might be the same, or different. Incidentally, it is preferable that the separators are joined at least on the positive electrode tab group side because the positive electrode tab is often configured with a metal foil, such as aluminum foil, having a relatively low rigidity.

For example, in the above-described embodiment, the shape of the join part is made to be rectangle, but the present disclosure is not restricted to this. The shape of the join part can be several shapes, for example, a square-like shape, a circle-like shape, a oval shape, or the like. In addition, the join parts herein disclosed might be formed intermittently. Incidentally, in the above-described embodiment, the shapes of the join parts at 2 points are the same, but the present disclosure is not restricted to this, and the shapes of the join parts at 2 points might be different.

For example, in the above-described embodiment, at least a part of the join parts is disposed at a position (in other words, portion coming into contact with the boundary portion) adjacent to the boundary portion, but the present disclosure is not restricted to this. In the herein disclosed technique, it is enough that at least a part of the join parts is closer to the boundary portion. Incidentally, the wording "closer" in the present specification and Claims means a concept semantically covering adjacent, and can semantically cover an aspect of being disposed by a predetermined interval away from an object portion, within a range capable of obtaining the effect of the herein disclosed technique. In other words, the wording closer to the boundary portion can semantically cover an aspect of being adjacent to the boundary portion, and an aspect of being disposed by a predetermined interval away from the boundary portion within a range capable of obtaining the effect of the herein disclosed technique. Incidentally, although it is not intended to restrict the present disclosure, for example, in a case of the above-described embodiment, when a length of the separator 26 (for more details, separator 26') in the Z direction is treated as 100%, the join part 1 can be formed away from the boundary portion 2 by an interval within a range approximately 1% to 5%, and not more than 3% is suitable.

For example, in the above-described embodiment, the separators are joined to each other by heat press, but the present disclosure is not restricted to this. By performing ultrasonic joining with heating, applying an adhesion agent, or the like, it is possible to join the separators to each other. Additionally, for example, in a case where a protective layer is provided on a surface of the separator, ultrasonic joining with heating is preferable. In that case, a heating temperature, a frequency of ultrasonic, or the like can be suitably decided by making a person skilled in the art perform a preliminary test, or the like. Then, for example, in a case where the adhesion agent is used to join the separators to each other, it is possible to use Cemedine PPX (registered trademark), or the like, as an example of the adhesion agent described above. Alternatively, it is possible to use a hot-melt type of adhesion agent.

Figure 15:
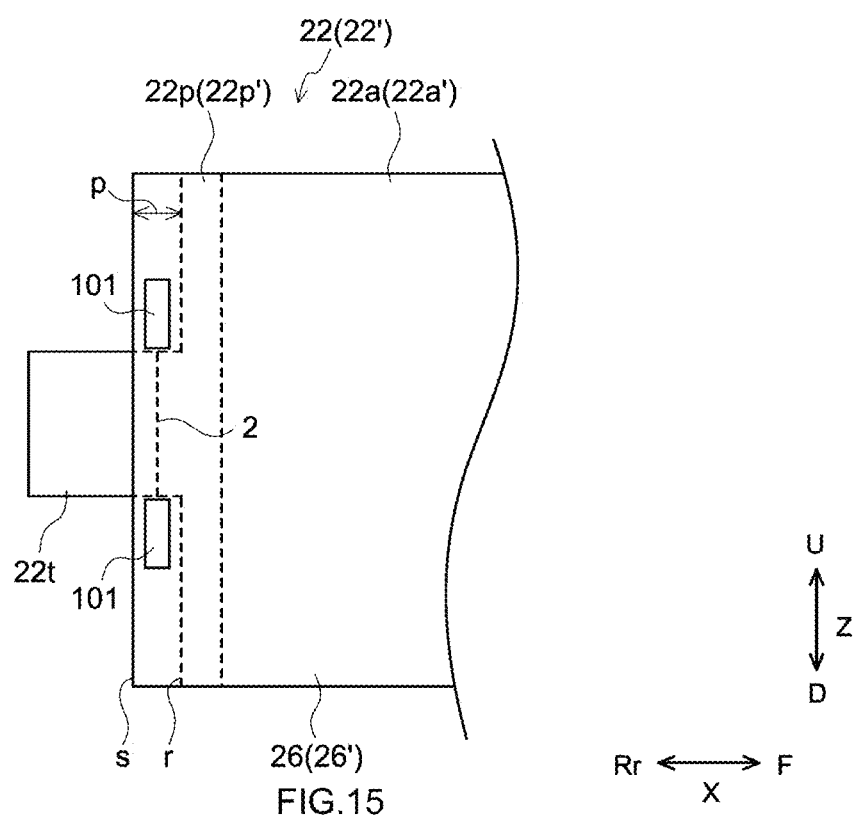
FIG. 15 is a FIG. 10 corresponding view in accordance with Embodiment 2.

FIG. 15 is a FIG. 10 corresponding view in accordance with Embodiment 2. As shown in FIG. 15, in Embodiment 2, the join part 101 is disposed at both sides of the boundary portion 2. Here, an area on which the join part 101 is formed is not particularly restricted if the effects of the technique herein disclosed are implemented. It is preferable that, for example, in a case where the shortest distance p described above is treated as 100%, the join part 101 is included in an area approximately 5% to 30% (for example, 10% to 20%) in the Y direction with the boundary portion 2 as the center. In addition, the shape of the join part 101 can be designed in reference to, for example, the above-described (B/A).

Figure 16:
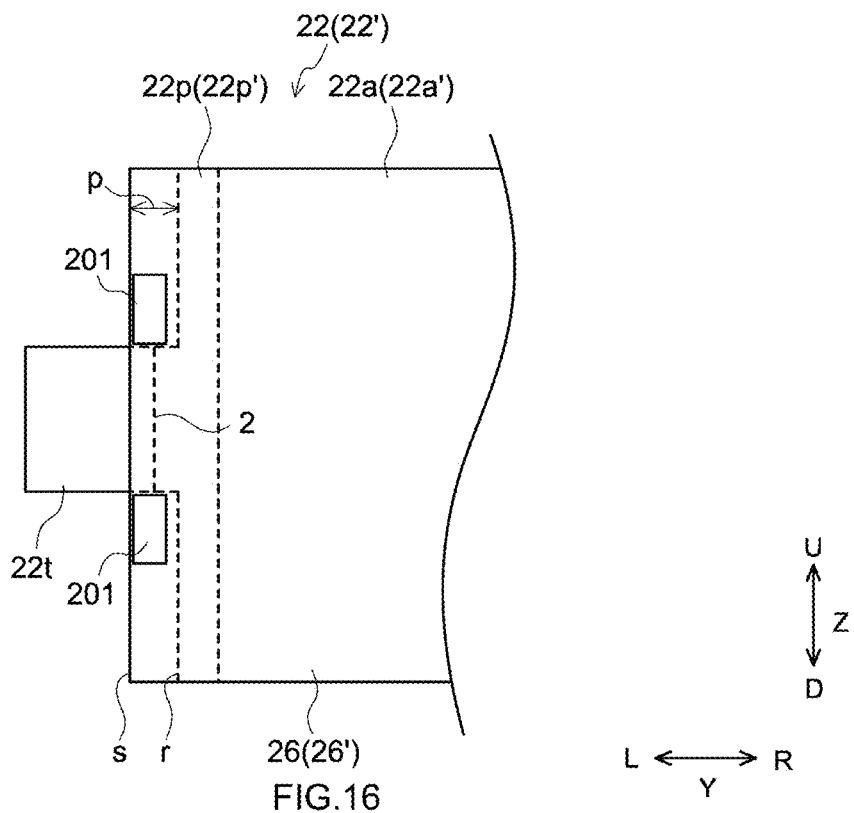
FIG. 16 is a FIG. 10 corresponding view in accordance with Embodiment 3.
Figure 17:
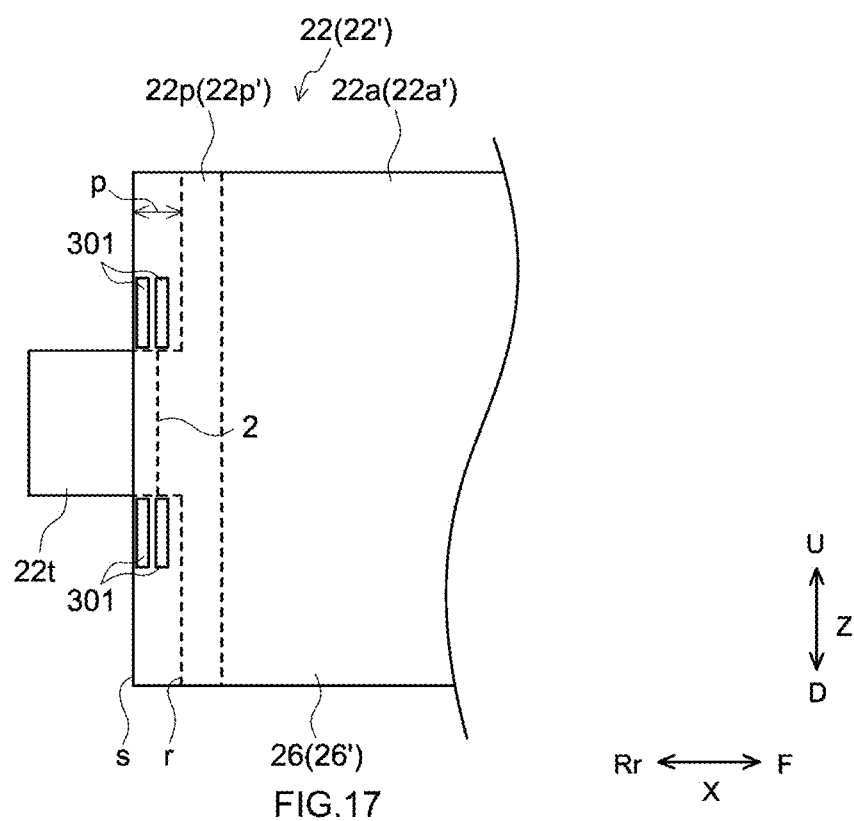
FIG. 17 is a FIG. 10 corresponding view in accordance with Embodiment 4.

FIG. 16 is a FIG. 10 corresponding view in accordance with Embodiment 3. As shown in FIG. 16, in Embodiment 3, the join part 201 is disposed in an area from the end part s to a side of the boundary portion 2. In addition, FIG. 17 is a FIG. 10 corresponding view in accordance with Embodiment 4. As shown in FIG. 17, in Embodiment 4, the join parts 301 are disposed at a portion from the end part s in a R direction and at a side of the boundary portion 2.

Figure 18:
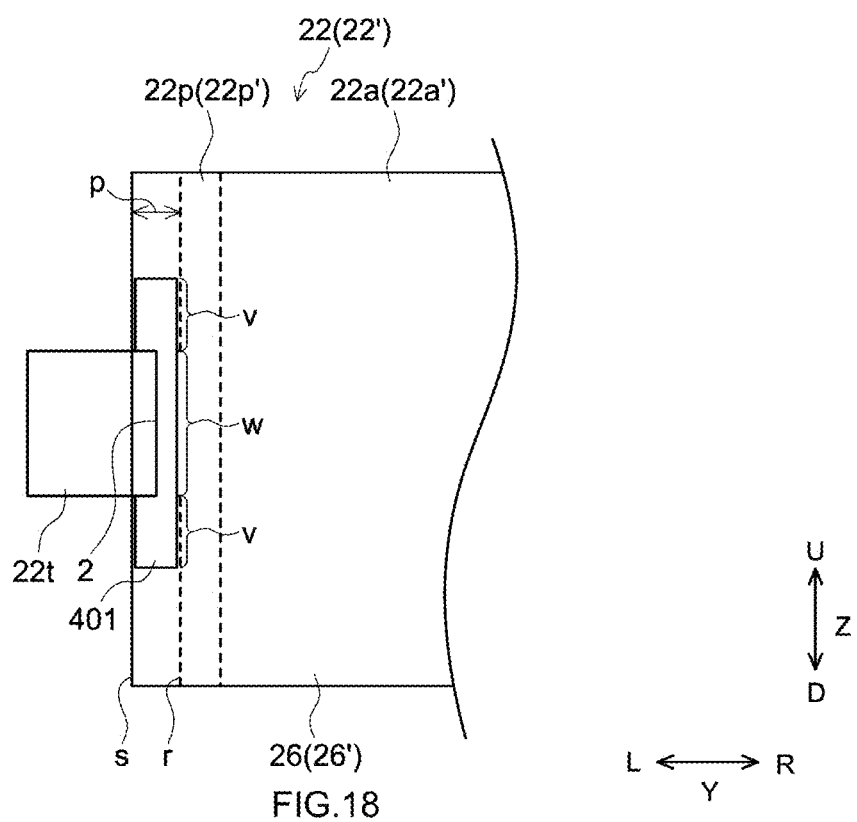
FIG. 18 is a FIG. 10 corresponding view in accordance with Embodiment 5.

FIG. 18 is a FIG. 10 corresponding view in accordance with Embodiment 5. As shown in FIG. 18, in Embodiment 5, the join parts 401 are disposed at both sides of the boundary portion 2, and an overlap portion W of the positive electrode tab 22t and the separator 26 (for more details, separator 26'). In addition, the positive electrode protective layer 22p is disposed on the overlap portion W of the positive electrode tab 22t. According to the battery including the join part 401 having the configuration as described above, it is possible to suitably suppress vibration applied to the positive electrode tab 22t by the join part 401, and thus it is preferable. Incidentally, forming the join parts of the above-described Embodiment 2 to Embodiment 5 can be implemented, for example, by adjusting the shape of the horn, or the like.

The invention claimed is:

1. A battery, comprising:
   one or a plurality of electrode bodies, each having a laminate structure in which a first electrode and a second electrode being a counter electrode of the first electrode are configured to overlap via a separator; and
   a battery case that is configured to accommodate the electrode body, wherein
   the battery case comprises:
      an outer package that comprises a bottom wall, a pair of first side walls extending from the bottom wall and being mutually opposed, a pair of second side walls extending from the bottom wall and being mutually opposed, and an opening part being opposed to the bottom wall; and
      a sealing plate which is configured to seal the opening part and to which a terminal electrically connected to the first electrode is attached,
   the electrode body comprises:
      a first electrode tab group comprising a plurality of tabs that protrude from an end part opposed to one second side wall of the pair of second side walls; and
      a second electrode tab group comprising a plurality of tabs that protrude from an end part opposed to another second side wall of the pair of second side walls,
   the first electrode tab group and the terminal are electrically connected via an electrical collector part,
   the first electrode tab group is joined to the electrical collector part in a state of being bent to arrange at least a part of the first electrode tab group along one second side wall among the pair of second side walls,
   the tab comprises a boundary portion between a forming area on which an active material layer or a protective layer is disposed and a tab exposed area on which the tab is exposed,
   at least a part of the separators, among the separators configuring the electrode body having the laminate structure, are joined to each other, and
   at least a part of the join part is disposed closer to the boundary portion.

2. The battery according to claim 1, wherein
the separators on which the join part is disposed are unevenly distributed at a side where a bend of the first electrode tab group is softer.

3. The battery according to claim 1, wherein
at least a part of the join part is adjacent to the boundary portion.

4. The battery according to claim 1, wherein
a shortest distance from a base portion of the tab to an end part of the separator in a protruding direction of the tab is twice or more of a shortest distance from the base portion of the tab to the boundary portion.

5. The battery according to claim 1, wherein
a ratio (B/A) of the join part with respect to a length A in a protruding direction of the tab and a length B in a direction orthogonal to the protruding direction of the tab is equal to or more than 1.3.

6. The battery according to claim 1, wherein
a number of the separators, on which the join part is disposed, is equal to or more than 3, and is equal to or less than 40% when a total number of the separators configuring the electrode body having the laminate structure is treated as 100%.

7. The battery according to claim 1, wherein
at least a part of the join part is disposed even at an overlap portion of the tab and the separators, and at least a part of the overlap portion on the tab comprises the protective layer.

* * * * *